Figure 1:
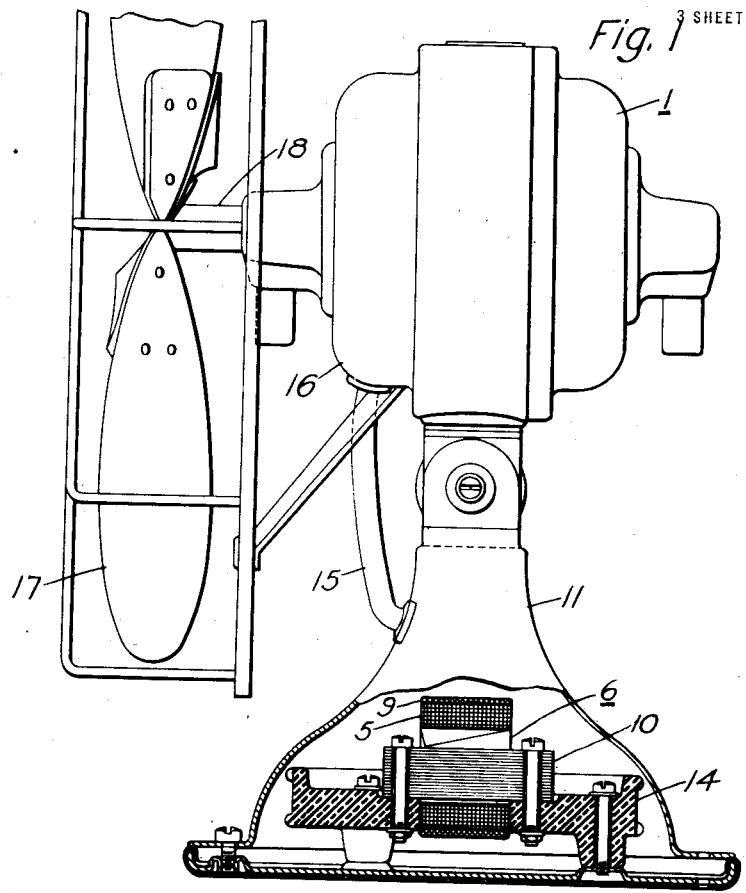

O. S. JENNINGS.
CONTROL OF SINGLE PHASE MOTORS.
APPLICATION FILED JUNE 13, 1917.

1,433,725.

Patented Oct. 31, 1922.
3 SHEETS—SHEET 1.

WITNESSES:
Fred. C. Wilharm
O. W. Kennedy

INVENTOR
Oliver S. Jennings
BY
Chesley G. Carr
ATTORNEY

O. S. JENNINGS.
CONTROL OF SINGLE PHASE MOTORS.
APPLICATION FILED JUNE 13, 1917.
1,433,725.
Patented Oct. 31, 1922.
3 SHEETS—SHEET 2.
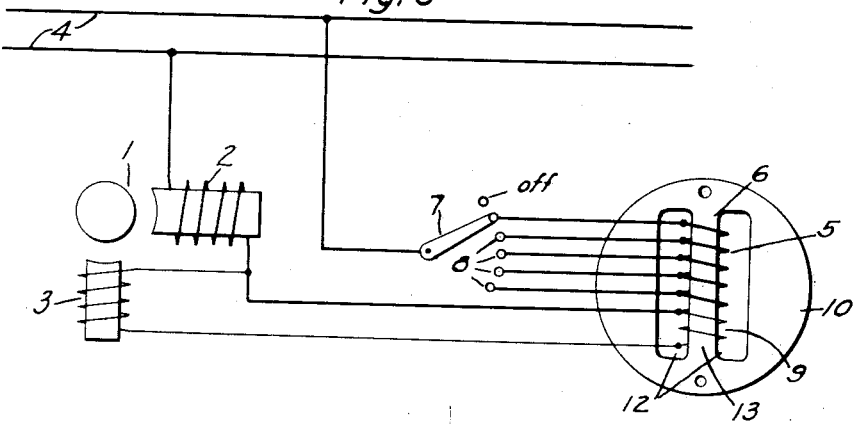
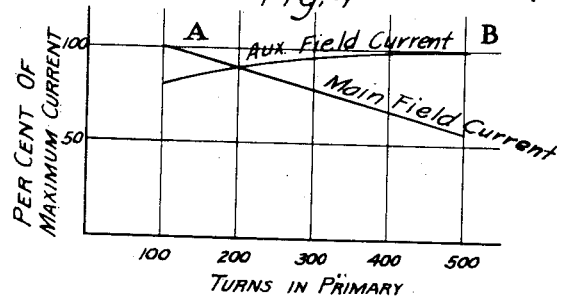
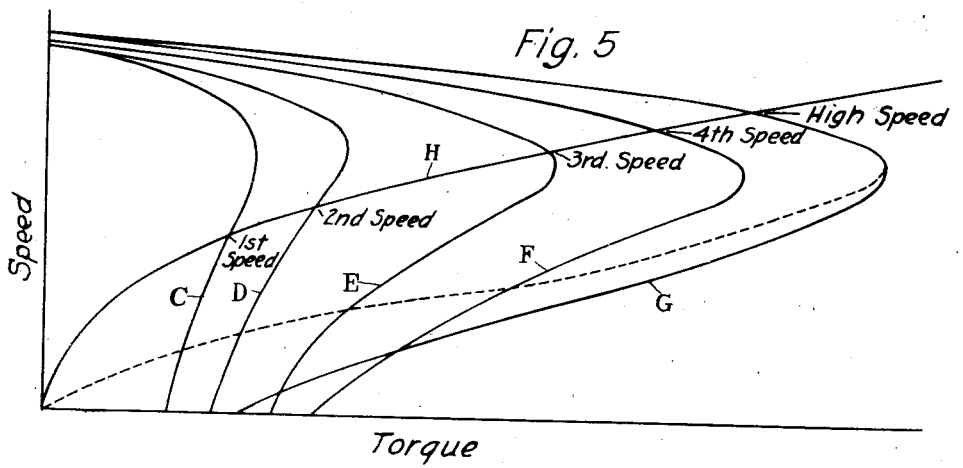
WITNESSES:
Fred. C. Wilharm
O. W. Kennedy
INVENTOR
Oliver S. Jennings
BY
Charles G. Carr
ATTORNEY

O. S. JENNINGS.
CONTROL OF SINGLE PHASE MOTORS.
APPLICATION FILED JUNE 13, 1917.

1,433,725.

Patented Oct. 31, 1922.
3 SHEETS—SHEET 3.

WITNESSES:
Fred. C. Wilharm
O. W. Kennedy

INVENTOR
Oliver S. Jennings
BY
Wesley G. Carr
ATTORNEY

Patented Oct. 31, 1922.

1,433,725

UNITED STATES PATENT OFFICE.

OLIVER S. JENNINGS, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROL OF SINGLE-PHASE MOTORS.

Application filed June 13, 1917. Serial No. 174,452.

*To all whom it may concern:*

Be it known that I, OLIVER S. JENNINGS, a citizen of the United States, and a resident of Wilkinsburg, in the county of Allegheny and State of Pennsylvania, have invented a new and useful Improvement in Control of Single-Phase Motors, of which the following is a specification.

My invention relates to the control of single-phase motors, particularly of the so-called split-phase type, and it has for its object to provide a method of control whereby such motors may be operated efficiently over a wide range of speed and without appreciably disturbing the voltage of the source to which they are connected.

Single-phase motors of the split-phase type have usually comprised main field windings and auxiliary starting windings arranged in quadrature relation. It has heretofore been customary to control the operation of a motor of this character by connecting an inductive device in the circuit of the main field winding, the starting winding being adapted to be connected directly across the line through the operation of a centrifugally actuated switch when desired. In such an arrangement, the starting winding was energized only during a very brief period, in order to enable the motor to develop sufficient starting torque, and was then cut out by the operation of the switch. Speed control of the motor has been usually effected by adjusting the inductive device in the circuit of the main field winding, such method being found satisfactory when the motor was employed to start and accelerate an ordinary mechanical load to a relatively high running speed.

But, when the motor was employed to drive a fan or any other load requiring a wide range of speed adjustment, difficulties were encountered in controlling the continuous operation of the motor at the lower speeds. This was due to the fact that, when a large amount of inductance was inserted in the circuit of the main winding, the voltage upon the main winding was so reduced that the motor did not develop sufficient torque to drive the fan blades. Under such conditions, the speed of the motor decreased until the centrifugally-actuated switch connected the starting winding in circuit again. It is obvious, however, that the motor would not operate efficiently with the starting winding operating continuously across the line, for the motor would then consume several times as much energy as it did at full speed. Furthermore, the starting winding would be liable to burn out if connected across the line for any considerable period.

According to my invention, I provide an arrangement in which the starting winding is adapted to be energized by a current in quadrature relation with the current in the main winding, thereby enabling the motor to develop sufficient torque at any speed and to operate with substantially the same characteristics as a two-phase motor. Furthermore, the starting winding is controlled without the use of a centrifugally-actuated device, the energization thereof being entirely dependent upon the energization of the main field winding and its strength varying inversely with the strength of the main field winding.

Figure 2:
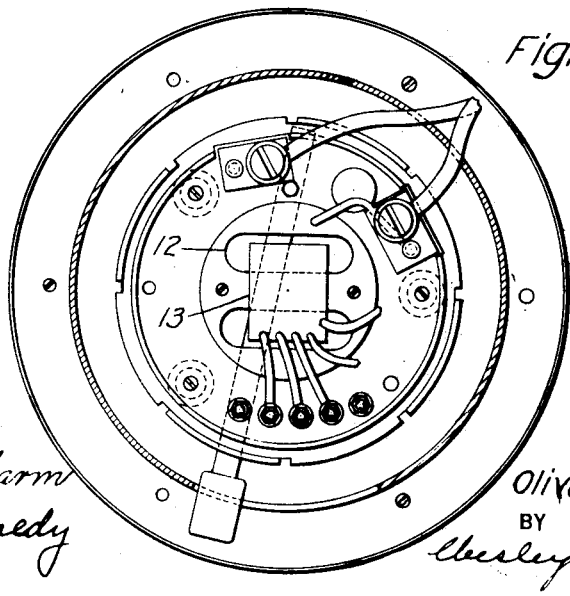

In the accompanying drawings, Figure 1 is a view, in side elevation, of a fan motor, parts of the base being broken away to show the location of my control device. Fig. 2 is a plan view of the base of the motor shown in Fig. 1; Fig. 3 is a diagrammatic view showing the circuit connections of the motor shown in Fig. 1; Figs. 4 and 5 are diagrams showing performance curves of the motor shown in Fig. 1, and Figs. 6 and 7 are views, similar to Figs. 1 and 3, respectively, showing a modification of my invention.

Referring to Fig. 3, a motor 1 comprises a main field winding 2 and an auxiliary starting winding 3. The winding 2 is connected in series circuit relation with the primary winding 5 of an auto-transformer 6, across a single-phase source of energy 4. The number of turns in the winding 5 may be varied by a movable contact member 7 that is adapted to engage a plurality of stationary contact members 8 which are respectively connected to different points of the winding 5. One terminal of the starting winding 3 is connected to one terminal of the primary winding 5 and the other terminal thereof is connected to the terminal of the secondary winding 9 of the transformer 6. With the connections as shown, current flowing in the winding 5 induces a voltage in the starting winding 3 that is substantially 90° ahead of it. The resistance of the starting winding causes a current to flow therein that is substantially in phase with the induced voltage and in quadrature relation with the current in the main winding. There is thus produced in the stator a nearly two-phase excitation, although the phases are not balanced.

As best shown in Figs. 1 and 2, the transformer 6 further comprises a core 10 that is located within the hollow base 11 of the motor 1. The core 10 comprises circular plates that are respectively provided with alined slots 12 to form a leg 13 upon which windings 5 and 9 are mounted in concentric relation. The core 10 is mounted upon a base 14 of insulating material which forms no part of the present invention. The leads from the windings of the transformer to the windings of the motor are located in a suitable cable 15 that extends between the base 11 and the casing 16 of the motor. A plurality of fan blades 17 are mounted upon the shaft 18 of the motor 1.

Figure 6:
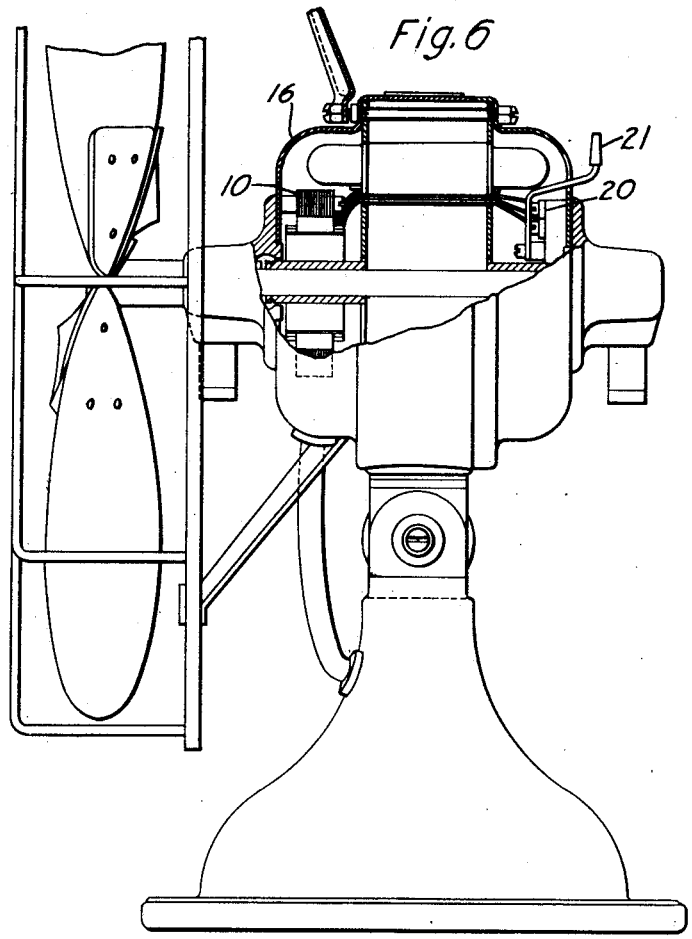
Figure 7:
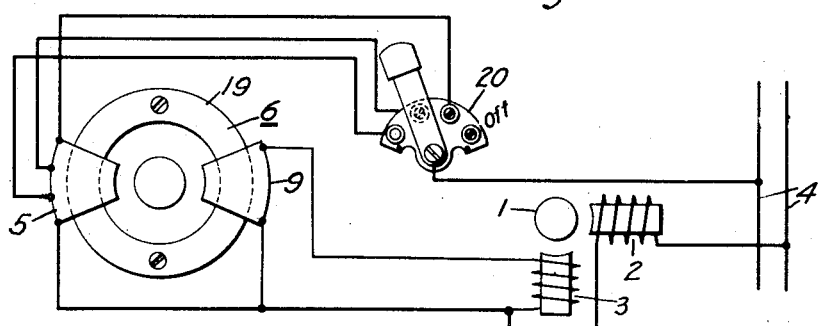

A modification of my invention is shown in Figs. 6 and 7 in which the core 10 of the transformer 6 is mounted within the enclosing casing 16 of the motor 1. The core 10 comprises annular plates 19, upon diametrically opposite portions of which the primary winding 5 and the secondary winding 9 of the transformer 6 are respectively mounted. A switch 20 for controlling the number of active turns in the primary winding 5 is located within the casing 16 of the motor at the end opposite that containing the core 10 and is provided with an operating handle 21 that projects through the casing.

Referring now to Fig. 4, curves A and B represent the current flow in the windings 2 and 3, respectively, at different speeds of the motor, percentages of the maximum currents traversing the respective windings being taken as ordinates and the number of turns in the primary winding 5, for different speeds, being taken as abscissæ. Fig. 5 shows the performance curves of the motor in which increments of speed are taken as ordinates and foot pounds of torque developed by the motor are taken as abscissæ. Curves, C, D, E, F and G, respectively, are speed-torque curves corresponding to different numbers of turns in the primary winding 5 and the curve H is the speed-torque curve of the fan, the points of intersection of the motor speed-torque curves with this curve representing the torque that must be developed by the motor in order to drive the fan at any given speed.

From an inspection of Figs. 3 to 5, it is apparent that at the first or low speed, the maximum number of turns of the primary winding 5 are connected in series with the main winding 2. Under this condition of operation, the excitation of the main field winding 2 is at a minimum, whereas the excitation of the starting winding 3 is at a maximum and the motor will develop a starting torque that is nearly equal to the torque required at first speed. As the number of turns in the primary winding 5 is decreased, the current in the main winding 2 increases while the current in the starting winding decreases, although the rate of change is greater in the main winding. As the excitations of the windings 2 and 3 vary in substantially inverse proportion, the starting torque developed by the motor for different positions of the control switch varies but little and will never fall to zero, as shown by the curves in Fig. 5 which, it will be noted, closely resemble the performance curves of a poly-phase motor. Furthermore, the fact that the percentage of variation of the current in the main winding is substantially twice the percentage of variation of the starting torque over the speed range shows that the continuous excitation of the starting winding at low speed enables the motor to operate satisfactorily.

From the foregoing, it is apparent that the motor will always develop sufficient torque to start and drive the fan at any given speed and that, while the starting winding is continuously energized during the operation of the motor, the amount of energy consumed therein will be very small, as compared with the energy consumed by starting windings that have heretofore been connected directly across the line. Furthermore, the fact that the energy consumed by the starting winding varies substantially inversely with the energy consumed in the main winding insures that the motor will operate with high efficiencies at all speeds.

While I have shown my invention in a plurality of forms, it will be obvious to those skilled in the art that it is not so limited but is susceptible of various minor changes and modifications within the scope of the appended claims.

I claim as my invention:

1. The combination with a source of alternating current and an electric motor of the single-phase induction type adapted to be connected thereto and comprising a main field-magnet winding and an auxiliary starting winding, of a transformer having its primary winding connected in series-circuit relation with said main field winding and its secondary winding connected across the terminals of said auxiliary winding, and means for varying the number of active turns in said primary winding for controlling the speed of said motor.

2. The combination with a source of alternating current and an electric motor of the single phase induction type adapted to be connected thereto and comprising a main field-magnet winding and an auxiliary starting winding, of a transformer having its primary winding connected in series-circuit relation with said main field winding and its secondary winding connected across the terminals of said auxiliary winding, and means for simultaneously varying the excitations of said windings in substantially inverse ratio.

3. The combination with a source of alternating current and an electric motor of the single-phase induction type adapted to be connected thereto and comprising a main field-magnet winding and an auxiliary starting winding, of a transformer having its primary winding connected in series-circuit relation with said main field winding and its secondary winding connected across the terminals of said auxiliary winding, and means for varying the number of active turns in the primary winding of said transformer whereby the excitations of said windings are varied in substantially inverse ratio.

4. The combination with a single-phase induction motor comprising a main field-magnet winding and an auxiliary starting winding, of means for varying the excitations of said windings simultaneously and in substantially inverse ratio.

5. The combination with a single-phase induction motor comprising a main field-magnet winding and an auxiliary starting winding, of means for varying the speed of said motor by varying the excitation of said auxiliary winding and that of said main winding in substantially inverse ratio.

6. The combination with an electric motor comprising an enclosing casing and a shaft rotatably mounted in bearings carried by the ends of said casing, of an inductive device for controlling the operation of said motor having its core member located within said casing and surrounding said shaft.

7. The combination with an electric motor comprising an enclosing casing and a shaft rotatably mounted in bearings carried by the ends of said casing, of an inductive device for controlling the operation of said motor comprising a core member located within said casing and surrounding said shaft at one end of the motor, and an operating handle located at the other end of the motor.

In testimony whereof, I have hereunto subscribed my name this 22nd day of May, 1917.

OLIVER S. JENNINGS.